United States Patent [19]

Horioka

[11] Patent Number: 5,355,311
[45] Date of Patent: Oct. 11, 1994

[54] METHOD AND APPARATUS FOR CREATING A CONNECTION MATRIX

[75] Inventor: Atsushi Horioka, Osaka, Japan

[73] Assignee: Matsushita Electric Industrial Co., Ltd., Osaka, Japan

[21] Appl. No.: 961,507

[22] Filed: Oct. 15, 1992

[30] Foreign Application Priority Data

Oct. 18, 1991 [JP] Japan .................. 3-270814

[51] Int. Cl.$^5$ .............................................. G06F 15/18
[52] U.S. Cl. ................................ 364/419.01; 395/23; 395/24
[58] Field of Search ................ 395/2, 23, 24, 51, 61, 395/63; 381/42, 43; 364/419.01

[56] References Cited

U.S. PATENT DOCUMENTS 5,033,087  7/1991  Bahl et al. ................................ 395/2
5,253,332  10/1993  Kumamoto .......................... 395/51

OTHER PUBLICATIONS

Bahl et al., "A Tree-Based Statistical Language Model for Natural Language Speech Recognition", Jul., 1989, IEEE Trans. ASSP, vol. 37, pp. 1001–1008.

Primary Examiner—Donald E. McElheny, Jr.
Attorney, Agent, or Firm—Willian Brinks Hofer Gilson & Lione

[57] ABSTRACT

The present invention relates to a connection matrix used for syntactic processing and is aimed at providing an apparatus for creating a connection matrix with enhanced accuracy of estimate. The apparatus features a likelihood calculating section that obtains said transition likelihood from a word sequence to a word, an entropy calculating section that obtains the entropy of each entry sequence using said transition likelihood, and an entry renewal section that renews entry sequences having greatest entropy with new entry sequences by adding each one of the words to the end of them.

4 Claims, 9 Drawing Sheets

Fig.3

| Subsequent symbol<br>Leading sequence of symbols | $W_1, W_2, \ldots\ldots W_M$ |
|---|---|
| $W_1$<br>$W_2$<br>$\vdots$<br>$\vdots$<br>$W_M$ | $\emptyset$ |

Fig.4

| Subsequent symbol<br>Leading sequence of symbols | $W_1, W_2, \ldots\ldots W_M$ |
|---|---|
| $W_1$<br>$W_2$<br>$\vdots$<br>$\vdots$<br>$W_k$<br>$\vdots$<br>$w(1-Nj),\cdots,w(i-1)$<br>$\vdots$ | $P\{w(i)=w1\|w(1-N),\cdots,w(i-1)\|$<br>$=w(1-Nj);\cdots,w(i-1)\}$ |

METHOD AND APPARATUS FOR CREATING A CONNECTION MATRIX

BACKGROUND OF THE INVENTION

1. Field of the Invention

The present invention relates to methods and apparatus for creating a connection matrix to be used for syntactic processing such as automatic speech recognizer and word processors.

2. Description of the Related Art

Recently systems such as speech automatic speech recognizers and word processors employing syntactic processing techniques have been widely used.

The language processing section of a automatic speech recognizer has usually a function that stores information about words (lexicon), and a function that estimates likelihood of correctness of a sequence of words by referring to a connection matrix. If the likelihood of a sequence is defined as a probability, which takes a value between 0 and 1, then the creation of a connection matrix becomes easy, and the following conventional example is based on this definition. The probability, or likelihood, that the word $w(i)$ follows the sequence of words $w(1) \cdot w(2) \ldots w(i-1)$ is hereafter denoted by $P\{w(i) \mid w(1) \cdot w(2) \ldots w(i-1)\}$. If the number of unique words is M, then the number of unique sequences of $w(1) \cdot w(2) \ldots w(i-1)$ is $M^{i-1}$. Therefore, it is almost impossible to register all probabilities for possible different sequences. However, by the (N+1)-gram approximation of the following formula (1), the number of registered probabilities can be limited to $M^{N+1}$.

$$P\{w(i) \mid w(1) \cdot w(2) \ldots w(i-1)\} \approx P\{w(i) \mid w(i-N) \cdot w(i-N+1) \ldots w(i-1)\} \quad (1)$$

FIG. 6 shows a block diagram of conventional apparatus for creating a connection matrix. In FIG. 6, a reference numeral 111 denotes a learning data storage section, which gathers and stores various sequences of words beforehand. 112 denotes a likelihood calculation section that obtains the transition likelihood or probability $P\{w(i) \mid w(i-N) \cdot w(i-N+1) \ldots w(i-1)\}$ for each sequence $w(i-N) \cdot w(i-N+1) \ldots w(i-1)$ using data stored in the storage section 111. 113 denotes a connection matrix, which is the set of all transition probabilities obtained by the section 112 and becomes the output of this apparatus.

The conventional apparatus organized as above obtains the transition likelihood from the sequence $w(i-N) \cdot w(i-N+1) \ldots w(i-1)$ to the symbol $w(i)$ by calculating the following formula (2).

$$P\{w(i) \mid w(i-N) \cdot w(i-N+1) \ldots w(i-1)\} = n\{w(i-N) \ldots w(i-1) \cdot w(i)\} / n\{w(i-N) \ldots w(i-1)\} \quad (2)$$

Here, $n\{w(i-N) \ldots w(i-1) \cdot w(i)\}$ is the total number of sequences $w(i-N) \ldots w(i-1) \cdot w(i)$ contained in the learning data stored in the storage section 111, and $n\{w(i-N) \ldots w(i-1)\}$ is the total number of sequences $w(i-N) \ldots w(i-1)$ contained in the learning data stored in the storage section 111.

Although the above method reduces the total number of registered likelihoods to $M^{N+1}$, it still can not register all likelihoods if it raises the number $M^{N+1}$ in order to increase the accuracy of the estimate.

SUMMARY OF THE INVENTION

The object of the present invention is therefore to provide an apparatus for creating a connection matrix with higher accuracy of estimate than the conventional one while limiting the total number of registered likelihoods to that of the conventional one.

In order to achieve the aforementioned objective, according to the present invention, there is provided an apparatus for creating a connection matrix, each element of which is a transition likelihood from a leading sequence of words to a subsequent word, comprising a learning data storage section for storing various sequences of words, a likelihood calculating section for calculating the transition likelihood from a leading sequence of words to a subsequent word for all indexes and subsequent words picked up from said various sequences of words stored in said learning data storage section, an entropy calculating section for calculating entropies for every index using transition likelihoods calculated by said likelihood calculating section and finding entropies larger than a predetermined threshold value and an index renewal section for renewing indexes having entropies found in the foregoing step by adding corresponding subsequent symbol to the end of each of said indexes.

According to a further aspect of the present invention, there is provided a method for creating a connection matrix, each element of which is a transition likelihood from a leading sequence of words to a subsequent words, comprising steps of calculating the transition likelihood from a leading sequence of words to a subsequent word for all indexes and subsequent words picked up form various sequences of words stored beforehand, calculating entropies for every index using transition likelihoods calculated in the foregoing step, finding entropies having values larger than a predetermined threshold for every index and renewing indexes by corresponding subsequent word to each of indexes with said entropies having found in the foregoing step.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 3 shows the connection matrix obtained by initial setting in the preferred embodiment;

FIG. 4 shows the connection matrix obtained by calculating transition likelihoods in the preferred embodiment;

DETAILED DESCRIPTION OF THE PREFERRED EMBODIMENTS

The preferred embodiment according to the present invention will be described below with reference to the attached drawings.

Figure 1:
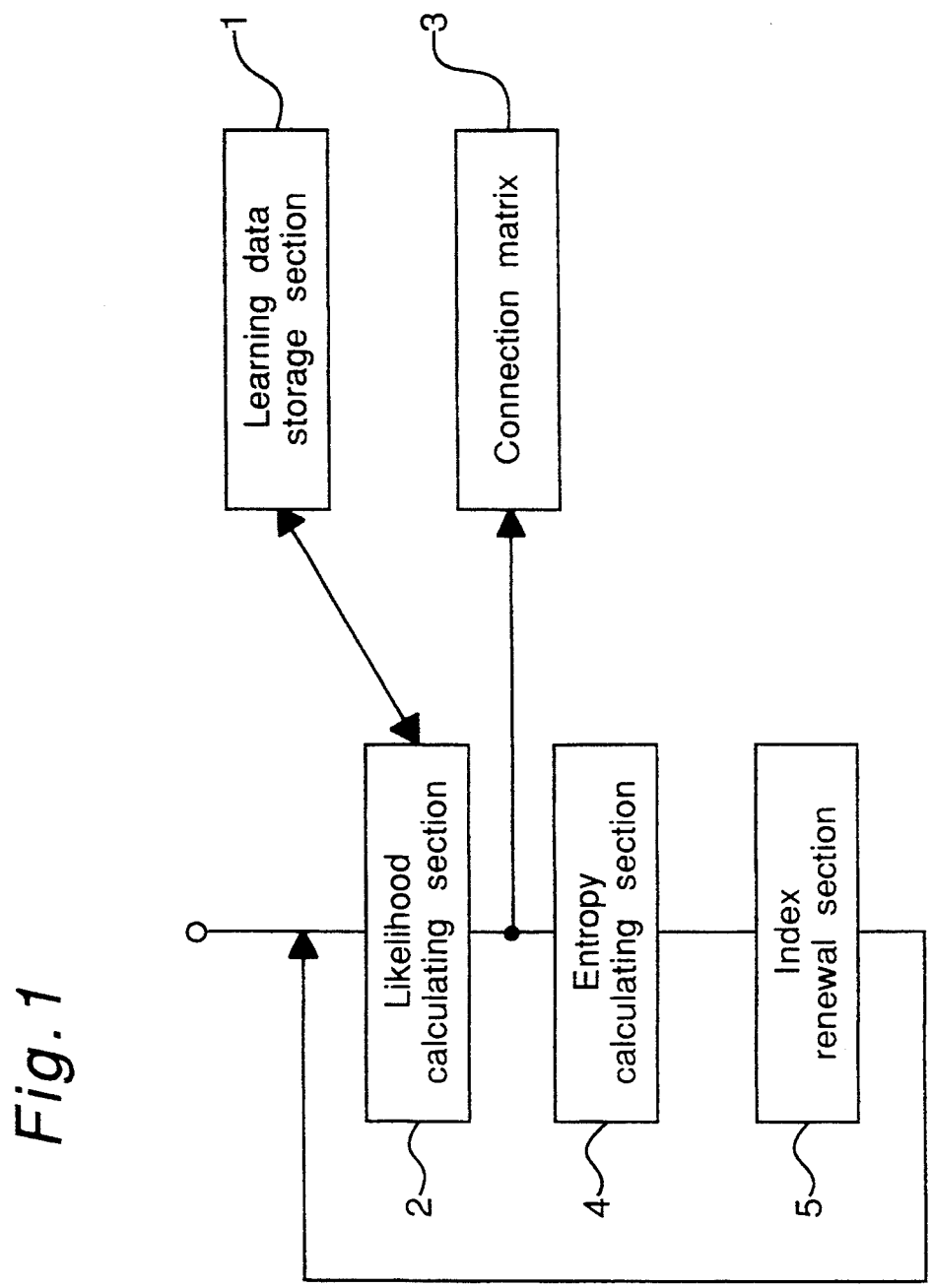
FIG. 1 shows a block diagram of the apparatus for creating a connection matrix according to a preferred embodiment of the present invention.

FIG. 1 shows a block diagram of the apparatus for creating a connection matrix of the preferred embodiment according to the present invention. In FIG. 1, a reference numeral 1 denotes a learning data storage section, which gathers and stores a number of sentences (word sequences) beforehand to be used as data for learning. A reference numeral 2 denotes a likelihood calculating section, which obtains the transition likelihood that a word w(i) follows a leading word sequence $w(i-N) \cdot w(i-N+1) \ldots w(i-1)$ using the learning data stored in the learning data storage section 1. Since the likelihood means a probability as in the conventional apparatus, the probability that the word w(i) follows the word sequence $w(i-N) \ldots w(i-1)$, which is denoted by $P\{w(i) | w(i-N) \ldots w(i-1)\}$, is the transition likelihood. A reference numeral 3 denotes a connection matrix, which is the set of all likelihoods obtained by the likelihood calculating section 2 and is the output of the present apparatus. A reference numeral 4 denotes an entropy calculating section, which calculates entropies for every index which defines a leading sequence of words picked up from the learning data and selects entropy values larger than a predetermined threshold value among the entropies for every index. A reference numeral 5 denotes an index renewal section which renews indexes by compositing respective subsequent symbols with each index if their combinations have larger entropies selected by said entropy calculation section.

Figure 2:
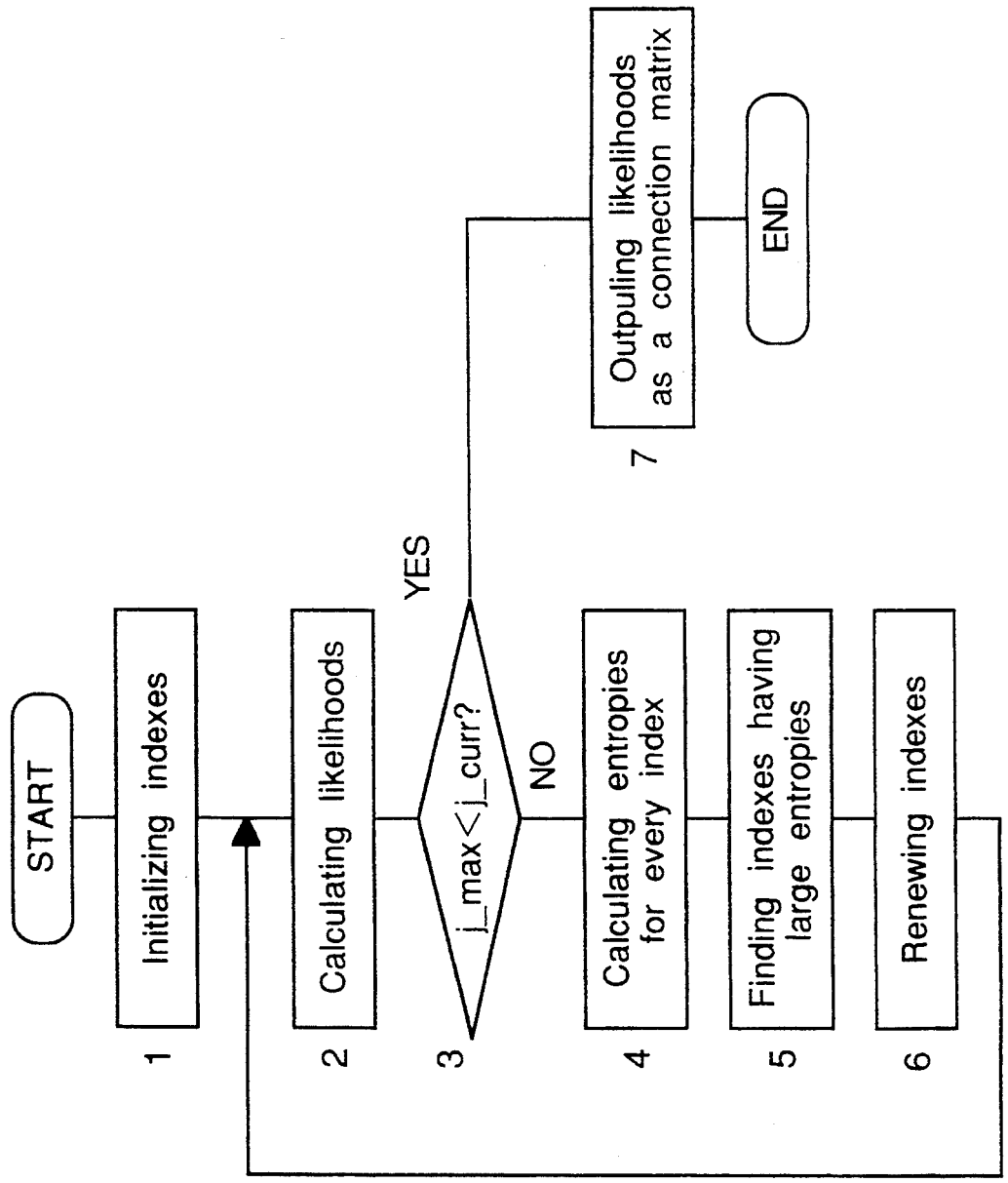
FIG. 2 shows a flow chart of creating a connection matrix in the preferred embodiment.
Figure 5:
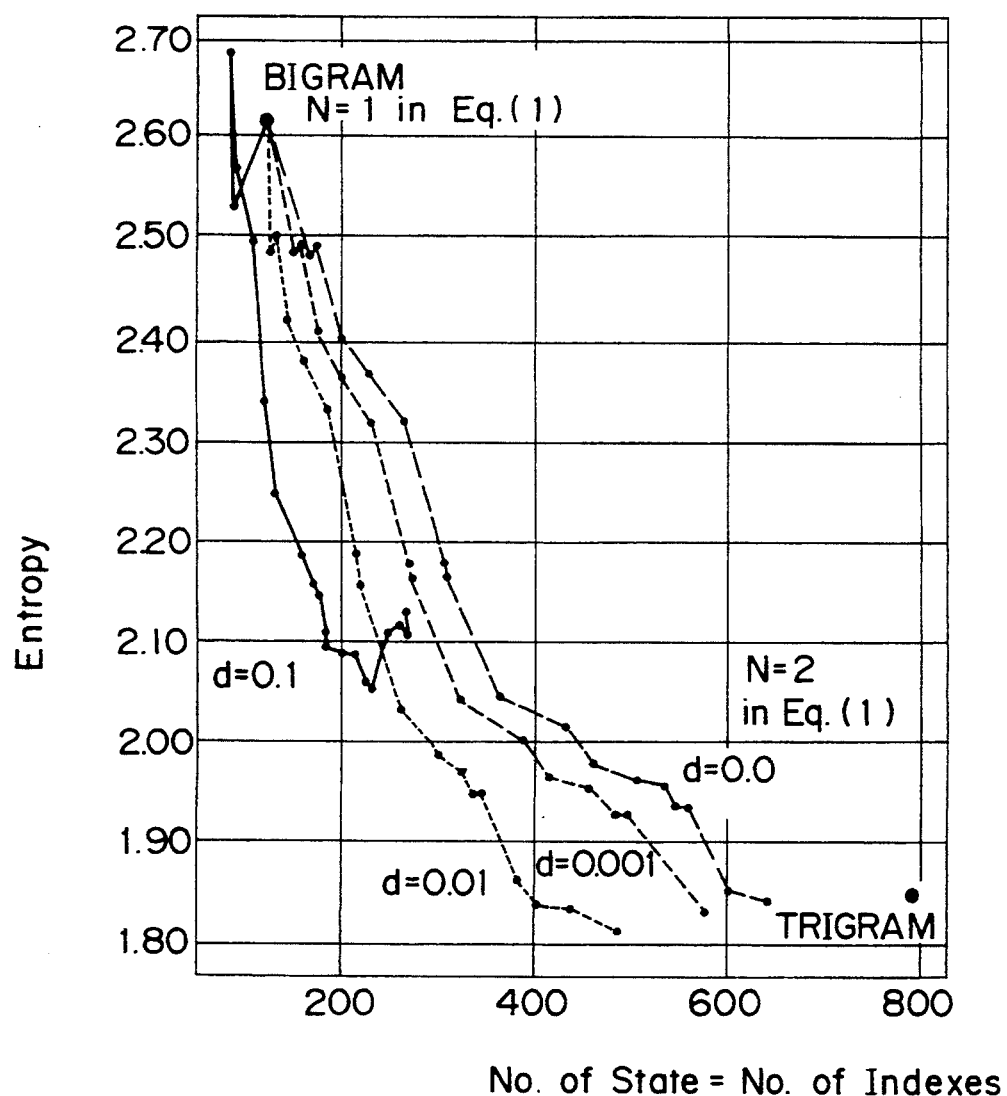
FIG. 5 is a graph showing a relationship between the entropy and number of indexes according to the present invention.
Figure 6:
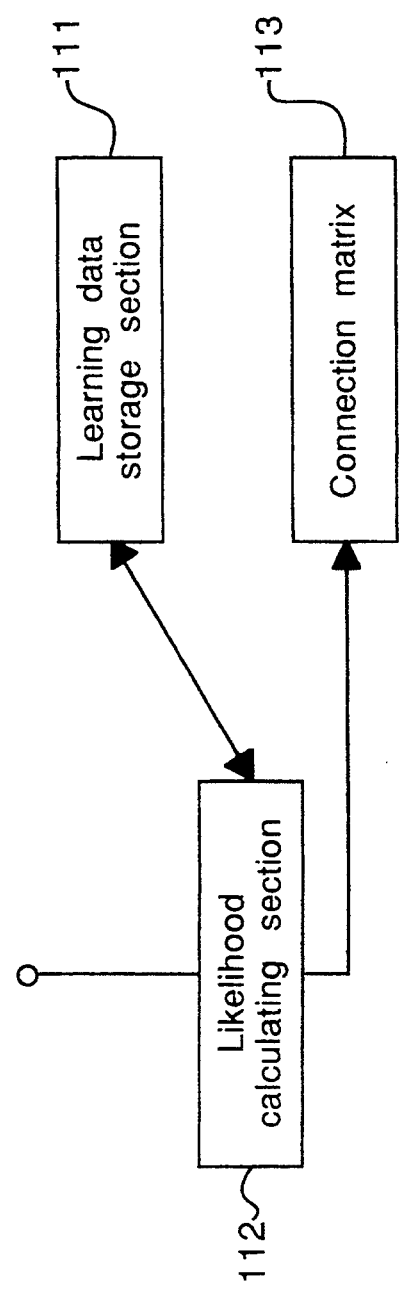
FIG. 6 shows a block diagram of conventional apparatus for creating a connection matrix.

The procedure of creating a connection matrix by means of the embodiment organized as above will be described below with reference to FIG. 2. In the following, the counter of each index will be denoted by j, the index having counter j will be denoted by $W_j$, and the upper bound of the total number of indexes will be denoted by j—max (j=1, 2, ..., j-max).

Step 1. In the beginning, all indexes are initialized by allocating each index to a single word of words $w_1, w_2, \ldots, w_M$ included in the learning data wherein M is the total number of unique words (vocabulary size) included therein. Therefore, if the current total number of entry sequences is denoted by j__curr, then j__curr=M. The connection matrix in this initial setting is shown in FIG. 3.

Step 2. The transition likelihood $P\{w_k | W_j\}$ that the word $w_k$ follows the word sequence $W_j$ is calculated for j=1, 2, ..., j__curr and k=1, 2, ..., M by the following equation (3) using the learning data stored in the data storage section 1.

$$P\{w_k | W_j\} = n\{W_j w_k\} / n\{W_j\} \tag{3}$$

where $n\{W_j w_k\}$ is the total number of occurrences of the word sequence $W_j \cdot w_k$ in the learning data, and $n\{W_j\}$ is the total number of occurrences of the word sequence $W_j$ in the learning data. The connection matrix obtained by Step 2 is shown in FIG. 4.

Step 3. If j__max < j__curr, then the procedure goes to Step 7.

Step 4. The entropy H(j) for each word sequence $W_j \cdot w_k$ is calculated for every index $W_j$ (j=1, 2, ..., j__curr) by the following equation (4).

$$H(j) = \sum_{k=1}^{M} P\{w_k | W_j\} \times \log_2 P\{w_k | W_j\} \tag{4}$$

Step 5. Among entropies for every index j, those having values larger than a predetermined threshold value Hth are found.

Step 6. Old indexes $W_j$ are renewed with new ones $W_j \cdot w_k$ when their entropies are found to be larger than Hth at step 6 and, at the same time, $N_j$ and j__curr are updated as $N_j+1$ and j__curr−1+M, respectively. Thereafter, the procedure goes to step 2.

Step 7. The set of all transition likelihoods is output as a connection matrix.

Figure 7:
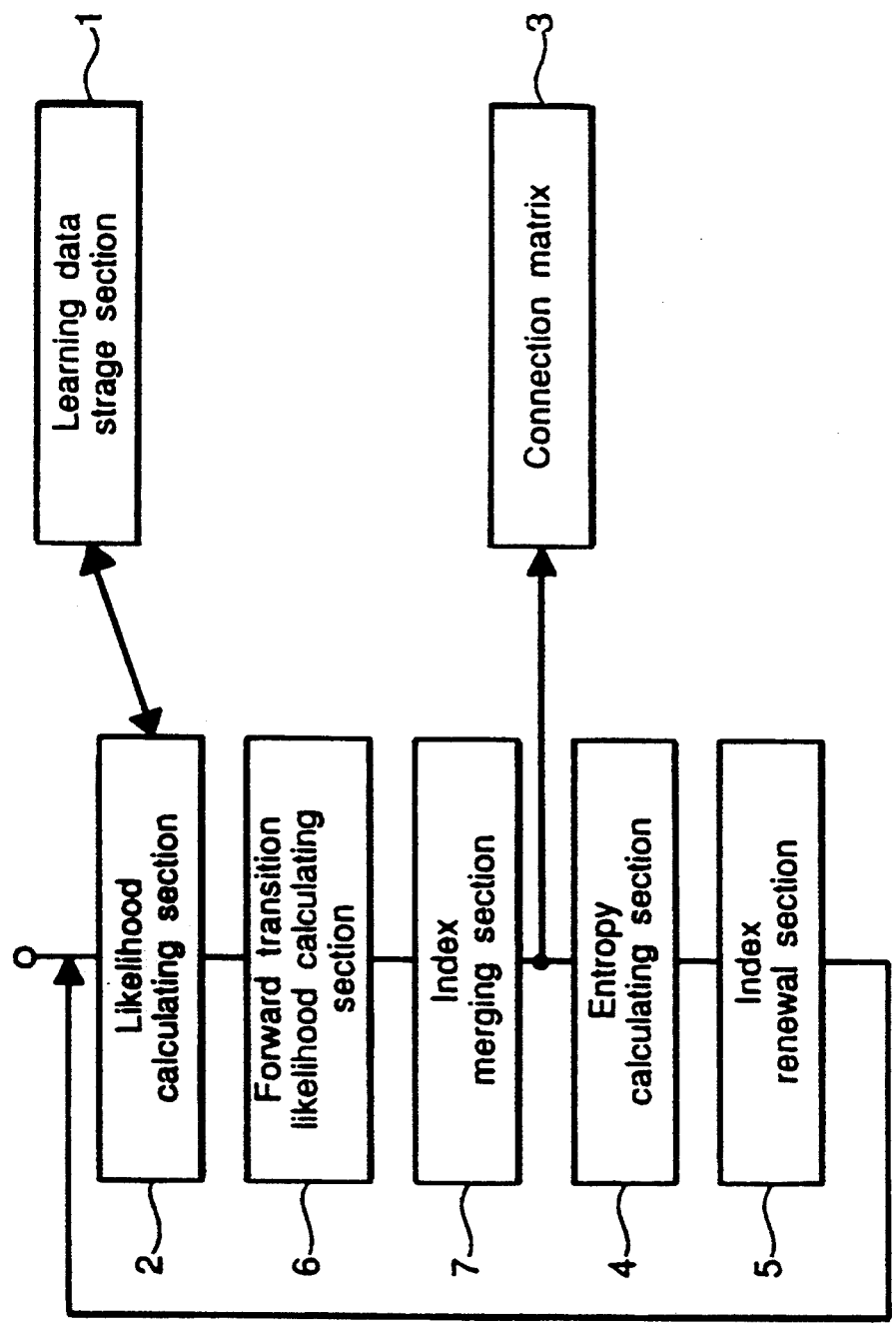
FIG. 7 shows a block diagram of an apparatus for creating a connection matrix according to another embodiment of the invention.
Figure 8:
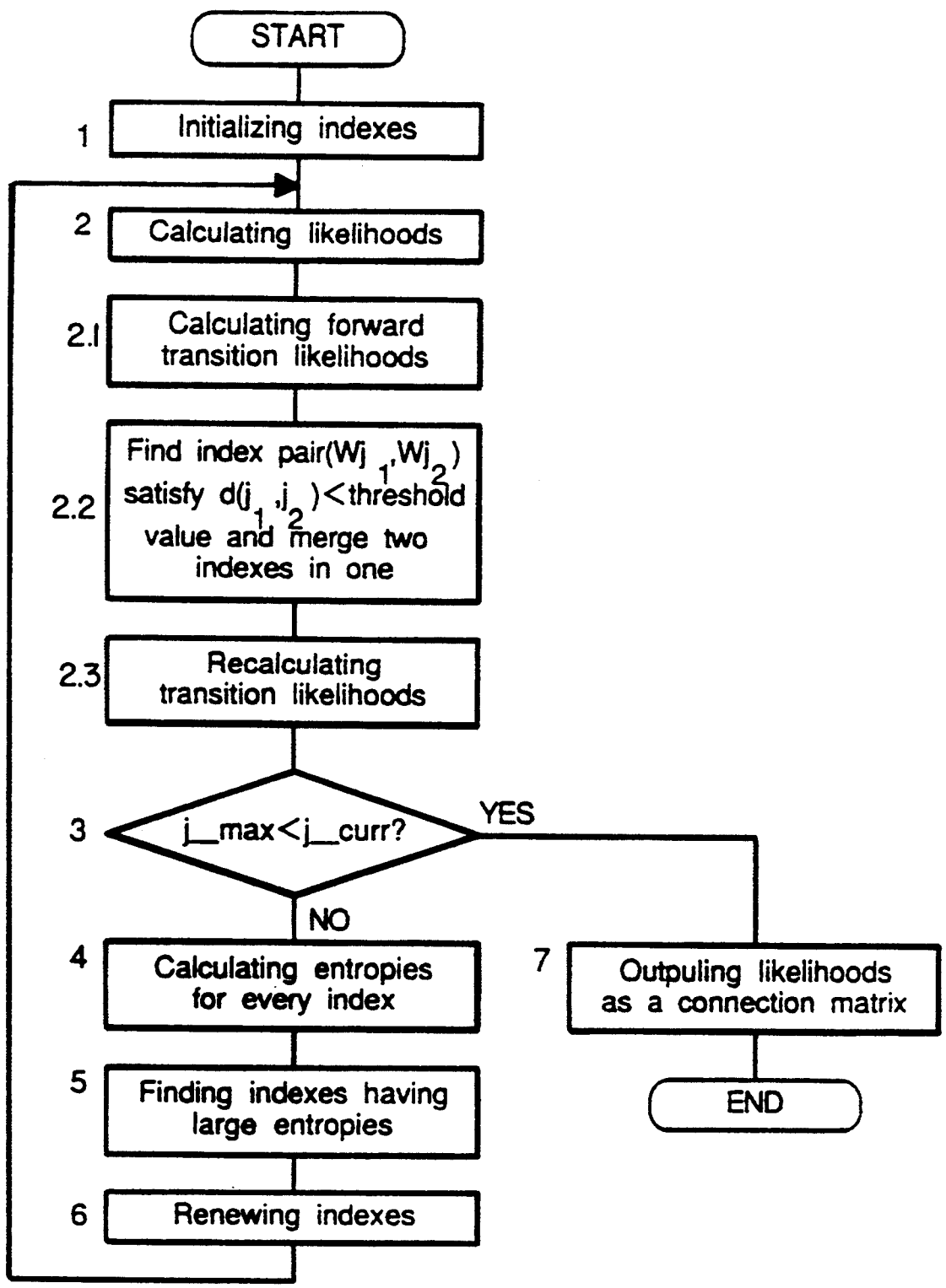
FIG. 8 shows a flow chart of creating a connection matrix according to the block diagram of FIG. 7.

In addition to the above, it is possible according to another embodiment of the invention to reduce j__curr by executing the following procedures 2.1 to 2.3 after executing step 2. This embodiment is shown in block diagram form in FIG. 7 and in flow chart form in FIG. 8.

2.1 Forward transition likelihoods from all leading sequences of words to a subsequent word for all subsequent words are calculated according to the following equation (5).

$$P\{w_k | W_j\} = n(W_j w_k)/n(W_j) \tag{5}$$

wherein $n(W_j)$, $n(W_j \cdot w_k)$ denotes total numbers of occurrences regarding sequences of words $W_j$ and $W_j \cdot w_k$, respectively.

2.2 Each distance between indexes j1 and j2 is calculated according to the following equation (6).

$$d(j1, j2) = (1/M) \sum_K |\log_2 P(w_k | W_{j1}) - \log_2 P(w_k | W_{j2})| \tag{6}$$

If the distance thus calculated is smaller than a predetermined threshold value dth (d(j1, j2)<dth), the indexes $W_{j1}$ and $W_{j2}$ are renewed with one index $W_{j1} \cup W_{j2}$.

2.3 Likelihoods are recalculated according to the equation (3) using indexes renewed in the procedure 2.2.

Figure 9:
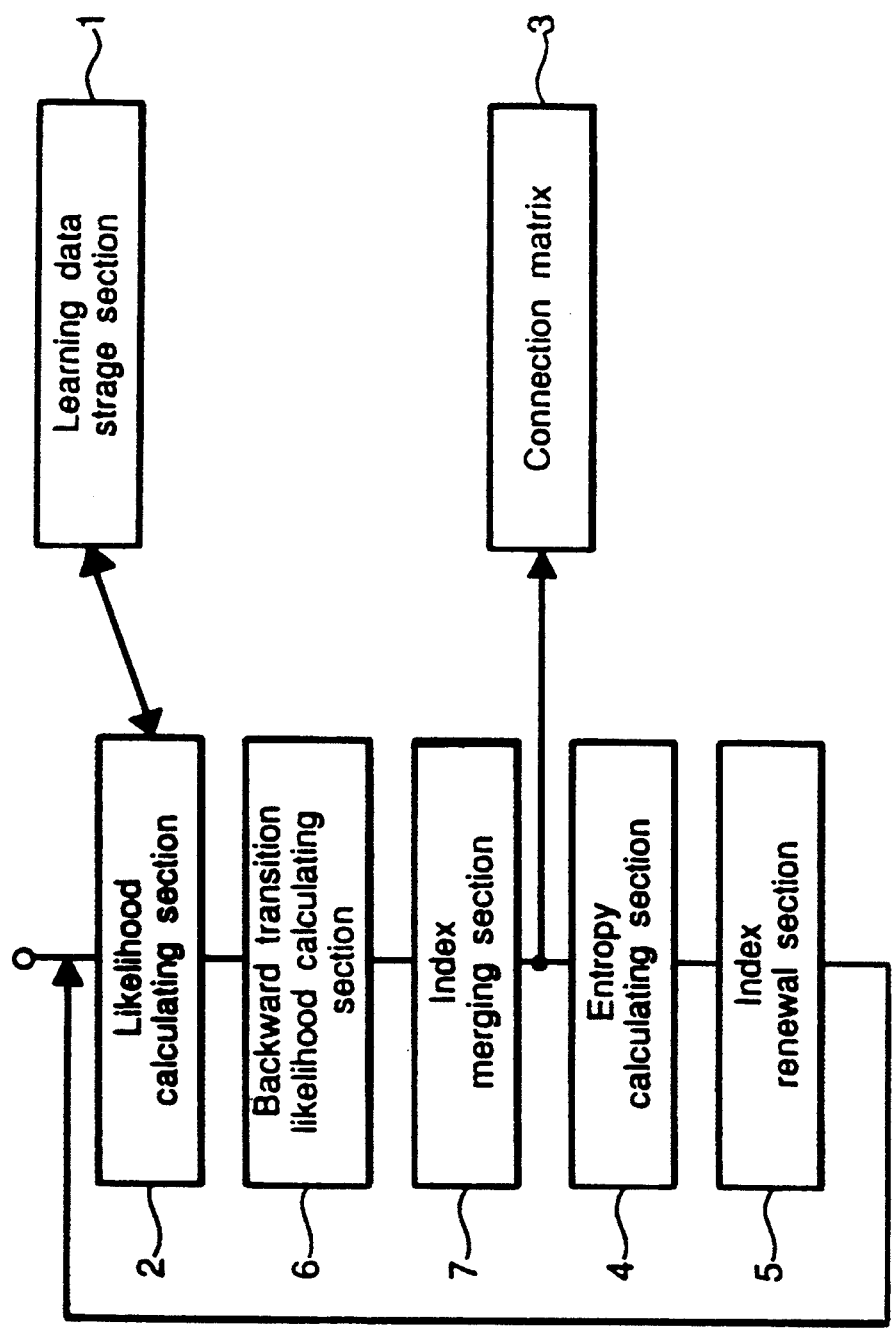
FIG. 9 shows a block diagram of an apparatus for creating a connection matrix according to yet another embodiment of the invention.
Figure 10:
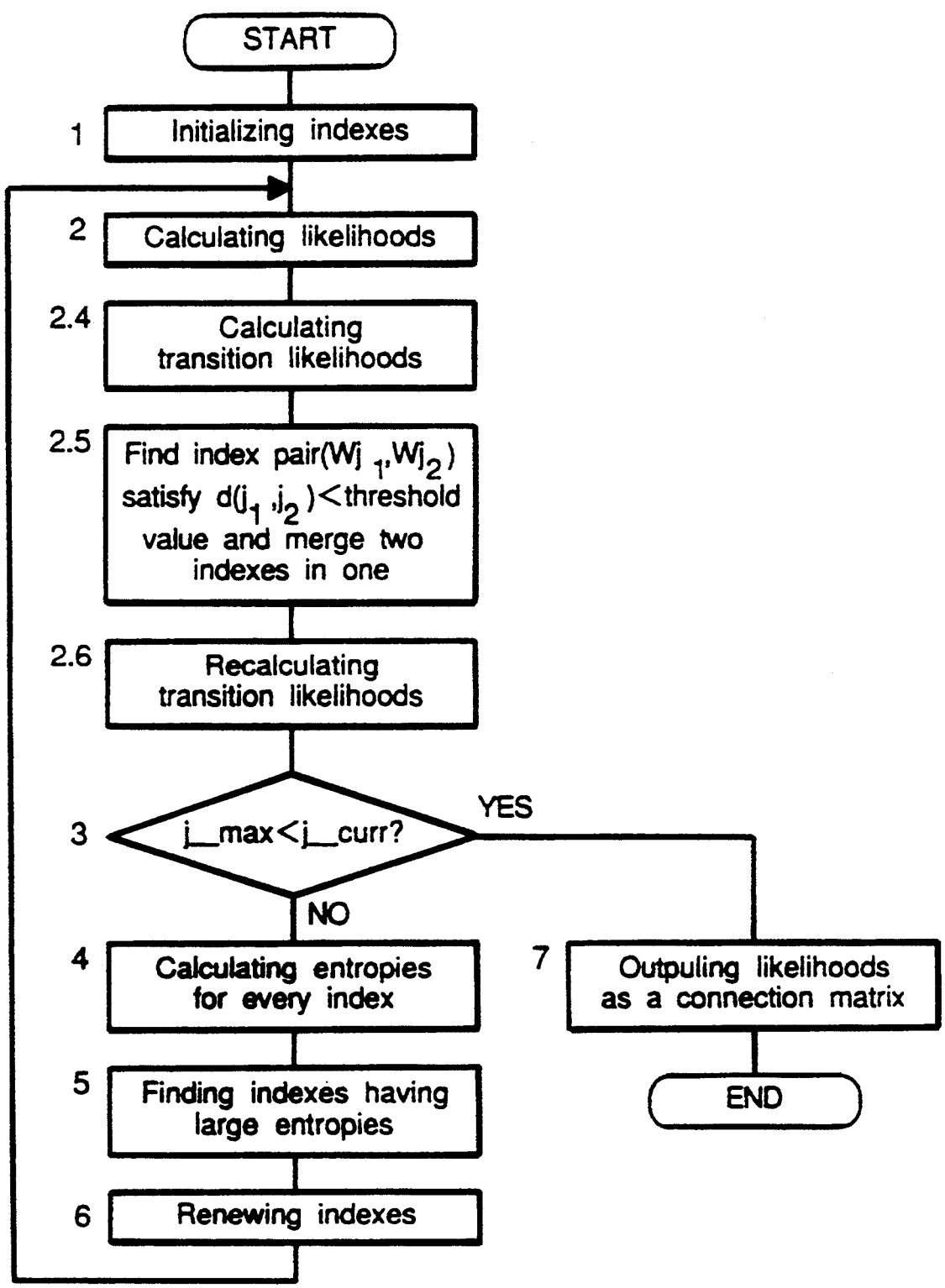
FIG. 10 shows a flow chart of creating a connection matrix according to the block diagram of FIG. 9.

Alternatively, it is possible according to another embodiment of the invention to reduce j__curr by executing the following procedures 2.4 to 2.6 after executing step 2. This embodiment is shown in block diagram form in FIG. 9 and in flow chart form in FIG. 10.

2.4 Backward transition likelihoods from a leading sequence of words to all subsequent words for all leading sequences of words are calculated according to the following equation (7).

$$P(w_i | W_j) = n(w_i \cdot W_j) / n(W_j) \tag{7}$$

wherein $n(W_j)$ and $n(w_i \cdot W_j)$ denotes total numbers of occurrences regarding sequences of words $W_j$ and $w_i \cdot W_j$, respectively.

2.5 Each distance between indexes j1 and j2 is calculated according to the equation (6).

If the distance calculated is smaller than a predetermined threshold dth, the indexes $W_{j1}$ and $W_{j2}$ are renewed with $W_{j1} \cdot W_{j2}$.

2.6 Likelihoods are recalculated according to the equation (3) using indexes renewed in the procedure 2.5.

Accordingly, The present invention has the following advantages.

(1) Since it generates indexes from those having high entropies, it creates a connection matrix having high accuracy while limiting the total number of indexes and registered likelihoods.

(2) Since renewal of indexes is performed by finding indexes having a short distance therebetween, the total number of indexes can be reduced while increasing data volume per index and, accordingly, the estimation accuracy of the connection matrix can be highly enhanced.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for creating a connection matrix, each element of which is a transition likelihood from a leading sequence of symbols to a subsequent symbol, comprising
    a learning data storage section for storing various sequences of symbols,
    a likelihood calculating section for calculating the transition likelihood from a leading sequence of symbols to a subsequent symbol for all indexes and subsequent symbols picked up from said various sequences of symbols stored in said learning data storage section,
    a forward transition likelihood calculation section for calculating forward transition likelihood from all leading sequences of symbols to a subsequent symbol for all subsequent symbols,
    an index merging section for merging indexes having forward transition likelihood similar to each other into one index,
    an entropy calculating section for calculating entropies for every index using transition likelihoods calculated by said likelihood calculating section and finding entropies larger than a predetermined threshold value, and
    an index renewal section for renewing indexes having entropies found in the foregoing step by adding corresponding subsequent symbol to the end of each of said indexes.

2. An apparatus for creating a connection matrix, each element of which is a transition likelihood from a leading sequence of symbols to a subsequent symbol, comprising
    a learning data storage section for storing various sequences of symbols,
    a likelihood calculating section for calculating the transition likelihood from a leading sequence of symbols to a subsequent symbol for all indexes and subsequent symbols picked up from said various sequences of sybmols stored in said learning data storage section,
    a backward transition likelihood calculation section for calculating backward transition likelihoods from a leading sequence of symbols to all subsequent symbols for all leading sequences of symbols,
    an index merging section for merging indexes having backward transition likelihoods similar to each other into one index,
    an entropy calculating section for calculating entropies for every index using transition likelihoods calculated by said likelihood calculating section and finding entropies larger than a predetermined threshold value, and
    an index renewal section for renewing indexes having entropies found in the foregoing step by adding corresponding subsequent symbol to the end of each of said indexes.

3. A method for creating a connection matrix, each element of which is a transition likelihood from a leading sequence of symbols to a subsequent symbol, comprising steps of
    calculating the transition likelihood from a leading sequence of symbols to a subsequent symbol for all indexes and subsequent symbols picked up from various sequences of symbols stored beforehand,
    calculating forward transition likelihoods from all leading sequences of symbols to a subsequent symbol for all subsequent symbols,
    merging indexes having forward transition likelihoods similar to each other into one index,
    calculating entropies for every index using transition likelihoods calculated in the foregoing step,
    finding entropies having values larger than a predetermined threshold for every index, and
    renewing indexes by corresponding subsequent symbol to each of indexes with said entropies having been found in the foregoing step.

4. A method for creating a connection matrix, each element of which is a transition likelihood from a leading sequence of symbols to a subsequent symbol, comprising steps of
    calculating the transition likelihood from a leading sequence of symbols to a subsequent symbol for all indexes and subsequent symbols picked up from various sequences of symbols stored beforehand,
    calculating backward transition likelihoods from a leading sequences of sybmols to all subsequent sybmols for all reading symbols,
    merging indexes having backward transition likelihoods similar to each other into one index,
    calculating entropies for every index using transition likelihoods calculated in the foregoing step,
    finding entropies having values larger than a predetermined threshold for every index, and
    renewing indexes by corresponding subsequent symbol to each of indexes with said entropies having been found in the foregoing step.

* * * * *